United States Patent
Courbon et al.

(10) Patent No.: US 8,657,249 B2
(45) Date of Patent: Feb. 25, 2014

(54) LOW PROFILE PIVOTING DETENT JOINT FOR A VEHICLE MIRROR ASSEMBLY

(75) Inventors: Emmanuel Courbon, Columbia, SC (US); Ramesh Noone, Columbia, SC (US); Mathieu Lhoste-Clos, Columbia, SC (US)

(73) Assignee: Lang-Mekra North America, LLC, Ridgeway, SC (US)

( * ) Notice: Subject to any disclaimer, the term of this patent is extended or adjusted under 35 U.S.C. 154(b) by 261 days.

(21) Appl. No.: 13/230,014

(22) Filed: Sep. 12, 2011

(65) Prior Publication Data

US 2013/0043362 A1 Feb. 21, 2013

Related U.S. Application Data

(60) Provisional application No. 61/523,899, filed on Aug. 16, 2011.

(51) Int. Cl.
*A47G 1/24* (2006.01)

(52) U.S. Cl.
USPC .............................. 248/479; 248/466; 16/334

(58) Field of Classification Search
USPC ............... 248/222.52, 224.7, 292.12, 297.31, 248/299.1, 466, 479, 480, 495; 359/841, 359/877, 881; 16/239, 330, 334, 354
See application file for complete search history.

(56) References Cited

U.S. PATENT DOCUMENTS

| | | | |
|---|---|---|---|
| 2,450,179 A | 9/1948 | Anderson, Jr. | |
| 3,784,149 A * | 1/1974 | Brudy | 248/478 |
| 4,623,115 A * | 11/1986 | Brester | 248/479 |
| 4,854,539 A | 8/1989 | Glue | |
| 5,841,594 A | 11/1998 | Rothe | |
| 6,286,968 B1 * | 9/2001 | Sailer et al. | 359/872 |
| 6,416,192 B2 | 7/2002 | Home et al. | |
| 6,439,730 B1 | 8/2002 | Foote et al. | |
| 7,048,395 B2 | 5/2006 | Lang et al. | |
| 7,137,715 B2 | 11/2006 | Schuurmans et al. | |
| 7,390,102 B2 | 6/2008 | Fimeri et al. | |
| 7,445,191 B2 | 11/2008 | Courbon | |
| 7,686,274 B2 | 3/2010 | Branham | |
| 8,336,845 B1 * | 12/2012 | Courbon | 248/479 |
| 2006/0006305 A1 * | 1/2006 | Fukai | 248/466 |
| 2007/0075202 A1 * | 4/2007 | Gordon | 248/289.11 |
| 2009/0166505 A1 | 7/2009 | Courbon | |

FOREIGN PATENT DOCUMENTS

GB 1387591 A 3/1975

* cited by examiner

*Primary Examiner* — Gwendolyn Baxter
(74) *Attorney, Agent, or Firm* — McNair Law Firm, P.A.; Sean P. Lahey (57) ABSTRACT

A carrier base with a lateral base extension having a base hollow interior channel. A tooth ring on the lateral base extension. A stop block channel within the base tooth ring. A support arm pivotally carried on the lateral base extension for carrying a mirror head. A tooth ring included on the support arm engaging the base tooth ring in interlocking cooperation. A stop block carried by the support arm within the support arm tooth ring so that the stop block travels between a first end wall and a second end wall to control movement of the support arm. A connecting bolt carried by the support arm extending through the tooth rings into the hollow base interior channel. A leaf spring biasing the connecting bolt into the hollow base interior channel to draw the support arm against the lateral base extension.

15 Claims, 7 Drawing Sheets

Fig. 8

LOW PROFILE PIVOTING DETENT JOINT FOR A VEHICLE MIRROR ASSEMBLY

CROSS REFERENCE TO RELATED APPLICATION

This application claims the benefit of and priority from U.S. Patent Application Ser. No. 61/523,899.

BACKGROUND OF THE INVENTION

1) Field of the Invention

The present invention relates to exterior vehicle mirror assemblies, and more particularly, to a pivoting detent joint for large commercial vehicle mirror assemblies that has a low profile while maintaining the proper detent compression function between components to hold the mirror assembly in a desired position.

2) Description of Related Art

Exterior vehicle mirror assemblies are known to include a pivoting detent joint connection between a carrier base attached to the vehicle and a support arm carrying the mirror head so that the mirror can be selectively positioned and held in a desired orientation. To provide the necessary detent function, large coil springs are generally used to draw the connecting elements together and hold the support arm in position. While these coil spring arrangements are generally sufficient to provide the necessary basing force, the designs tend to be relatively large and bulky to accommodate the components in the carrier base and support arm. The larger and heavier the mirror assembly gets, the more wear and tear is suffers due to road vibrations, which can lead to failure of the detent assembly to properly hold the mirror head in position. Additionally, larger mirror assemblies tend to have less desirable aerodynamic properties that can reduce fuel economy and also lead to undesirable wear and tear.

Also, it is desirable to provide a built-in stop mechanism to prevent unwanted rotation of the mirror assembly beyond defined or intended ranges of movement. In many mirror assemblies without stop mechanism, the mirror head can be moved to a point of hitting the vehicle, or moved beyond the limit of the detent joint to hold the support arm in position. Over rotation can thus damage the vehicle, the mirror assembly, or both.

Accordingly, it is an object of the present invention to provide an exterior vehicle mirror assembly with a low profile detent joint to provide a smaller, lighter, and more aerodynamic mirror assembly.

It is a further object of the present invention to provide a build-in stop mechanism for a low profile detent joint to prevent unwanted rotation of the support arm.

SUMMARY OF THE INVENTION

The above objectives are accomplished according to the present invention by providing a low profile pivoting detent joint for a vehicle mirror assembly, comprising a carrier base for mounting to the vehicle; a lateral base extension included on the carrier base and having a base hollow interior channel extending through the lateral base extension and the carrier base; a base tooth ring included on the lateral base extension defined by a series of grooves and ridges; a stop block channel disposed within the base tooth ring of the lateral base extension; the stop block channel including a first end wall spaced around an interior circumference of the base tooth ring from a second end wall to define the stop block channel; a support arm pivotally carried on the lateral base extension for carrying a mirror head; a support arm tooth ring included on the support arm defined by a series of grooves and ridges engaging the base tooth ring in interlocking cooperation for holding the support arm in a position relative to the lateral base extension; a stop block carried by the support arm and disposed within the support arm tooth ring; the stop block being received into the stop block channel so that the stop block travels between the first end wall and the second end wall to define a range of pivotal movement of the support arm on the lateral base extension; a connecting bolt carried by the support arm disposed within the support arm tooth ring and extending through the base tooth ring into the hollow base interior channel; and, a leaf spring carried in the hollow base interior channel engaging a connector head of the connecting bolt so that the leaf spring biases against an interior wall of the hollow base interior channel to draw the connecting bolt into the hollow base interior channel; whereby a pivoting detent joint is defined between the support arm and the lateral base extension of the carrier base.

In a further embodiment, a center column is disposed within the support arm tooth ring extending from the support arm into the stop block channel.

In a further embodiment, the connecting bolt extends from the support arm through the center column to the hollow base interior channel.

In a further embodiment, the stop block extends laterally outward from the center column into the stop block channel so that rotation of the support arm causes rotation of the center column and the stop block within the stop block channel.

In a further embodiment, the center column extends through the stop block channel and is received into a slot in the leaf spring in the base hollow interior channel so that a bottom side of the center column is positioned generally adjacent the connector head.

In a further embodiment, the detent joint includes a first guide block disposed adjacent a first side of the stop block, and a second guide block disposed adjacent a second side of the stop block opposite the first side.

In a further embodiment, the detent joint includes a first guide wall disposed in the stop block channel adjacent the first end wall, and a second guide wall disposed in the stop block channel adjacent the second end wall, wherein the first guide block engages the first guide wall when the stop block is rotated to engages the first end wall, and the second guide block engages the second guide wall when the stop block is rotated to engage the second end wall.

In a further embodiment, the first guide wall and the second guide wall extend circumferentially within the base tooth ring circumference, and the first end wall and the second end wall extend radially inward from the circumference of the base tooth ring in a generally transverse orientation to the first and second guide walls.

In a further embodiment, the detent joint includes a continuous wiring passage extending from the base hollow interior channel to a support arm hollow interior channel for running wires through the carrier base and support arm to the mirror head.

In a further embodiment, the continuous wiring passage is defined by a slot in the leaf spring, a first wiring channel disposed in the base tooth ring, and a second wiring channel disposed in the support arm tooth ring; wherein the slot, first wiring channel and second wiring channel are vertically aligned to provide a continuous opening from the base hollow interior channel to a support arm hollow interior channel.

In a further embodiment, the second wiring channel disposed in the support arm tooth ring is generally complementary in size to the stop block channel so that wires in the continuous wiring passage do not interfere with pivotal movement of the support arm defined by rotation of the stop block in the stop block channel.

BRIEF DESCRIPTION OF THE DRAWINGS

The construction designed to carry out the invention will hereinafter be described, together with other features thereof. The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiment and not restrictive of the invention or other alternate embodiments of the invention. In particular, while the invention is described herein with reference to a specific embodiment, it will be appreciated that the description is illustrative of the invention and is not constructed as limiting of the invention. Various modifications and applications may occur to those who are skilled in the art, without departing from the spirit and the scope of the invention.

DETAILED DESCRIPTION OF A PREFERRED EMBODIMENT

Figure 1:
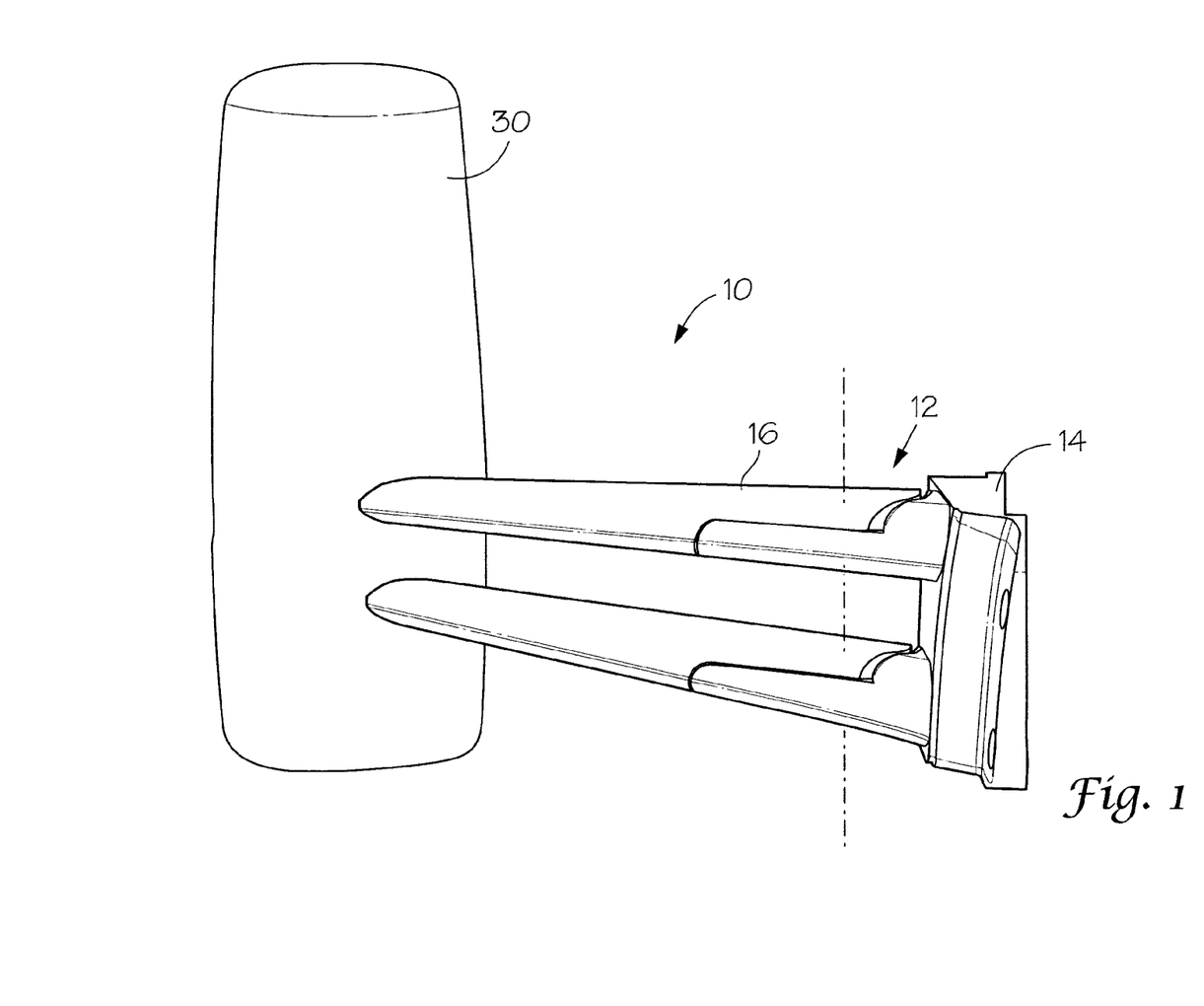
FIG. 1 shows a perspective view of a vehicle mirror assembly having a low profile pivoting detent joint according to the present invention.

With reference to the drawings, the invention will now be described in more detail. Referring to FIG. 1, vehicle mirror assembly, designated generally as 10, is shown which includes a low profile pivoting detent joint, designated generally as 12, interconnecting a carrier base 14 with a support arm 16. In the illustrated arrangement, a dual support arm configuration is shown, however, the low profile pivoting detent joint of the present invention may also be used in a single arm arrangement, which is considered within the spirit and scope of this invention.

Figure 2:
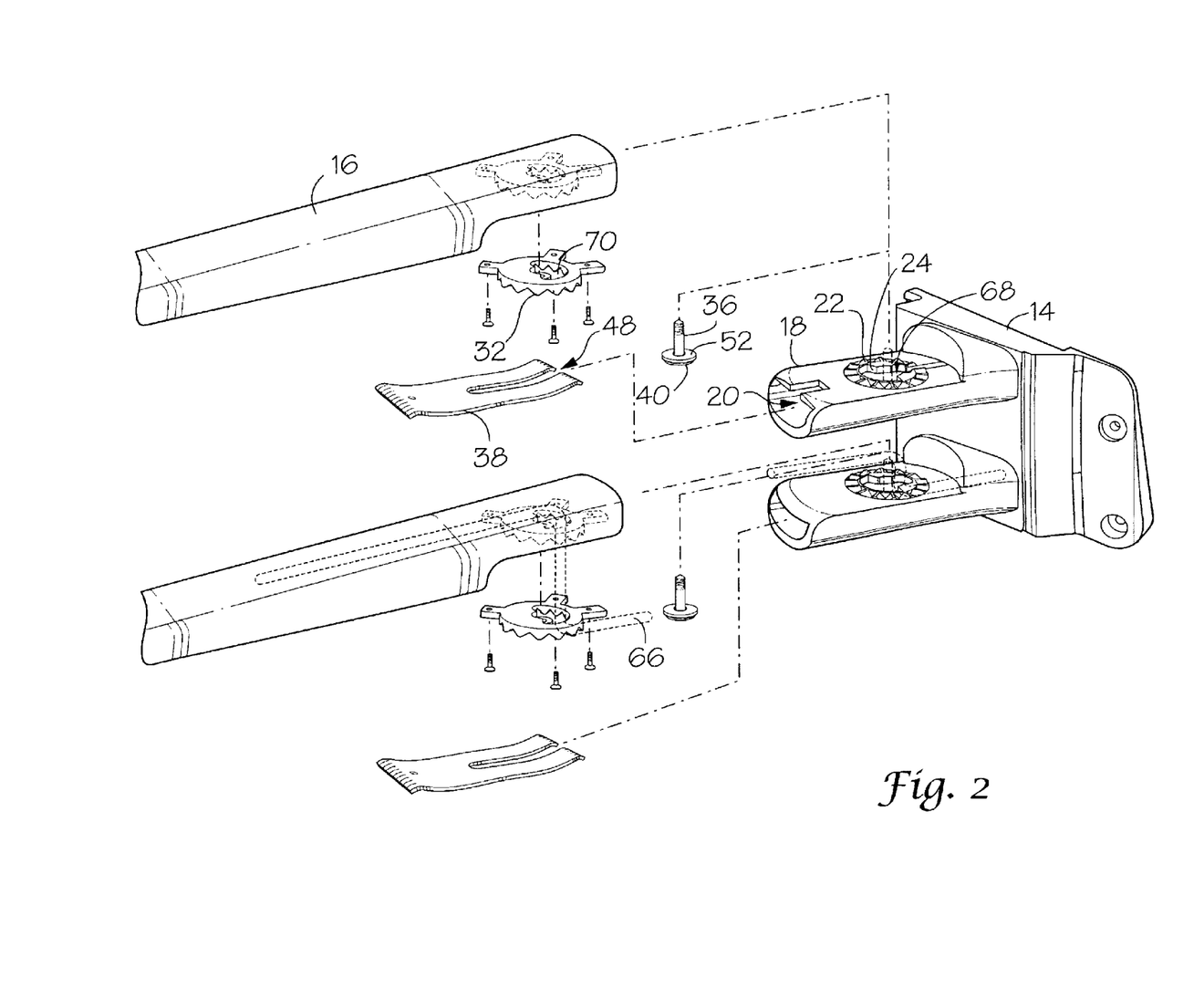
FIG. 2 shows an exploded view of the low profile pivoting detent joint according to the present invention.
Figures 3, 3A, 4:
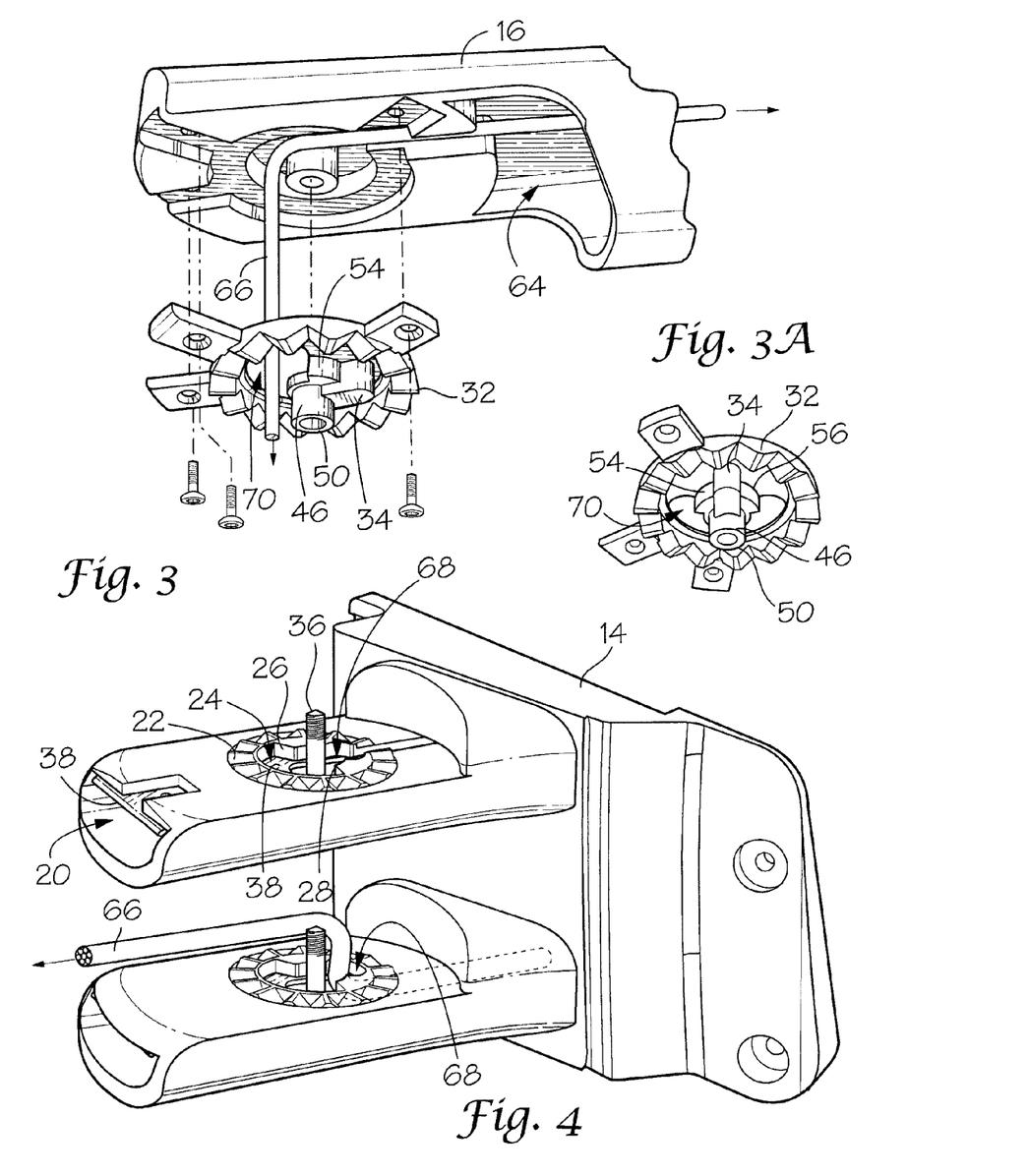
FIG. 3 shows a detailed exploded view of the support arm portion of the detent joint according to the present invention.
FIG. 3A shows a bottom view of the support arm tooth ring according to the present invention.
FIG. 4 shows a detailed perspective view of the carrier base portion of the detent joint according to the present invention.
Figure 6:
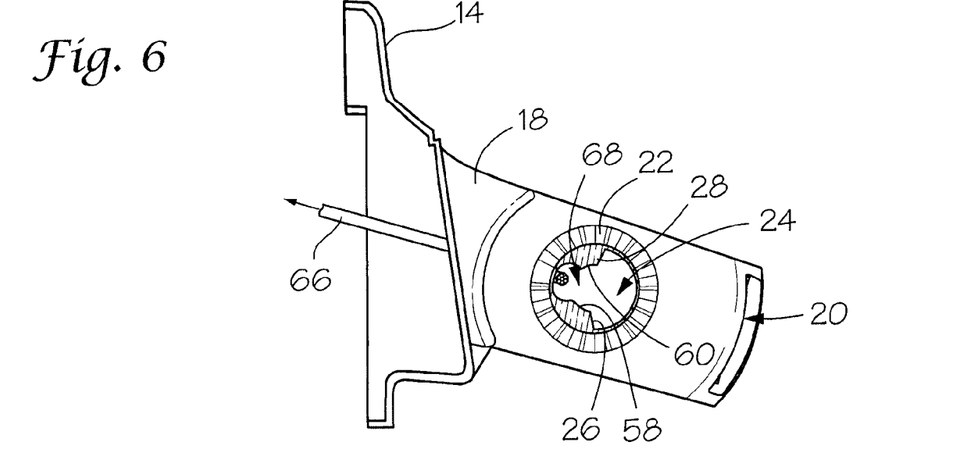
FIG. 6 shows a top view of the carrier base portion of the detent joint according to the present invention.

Referring to FIGS. 2, 4 and 6, the mirror assembly includes carrier base 14 for mounting to the vehicle. A lateral base extension 18 is included on carrier base 14 to which support arm 16 is pivotally mounted. Lateral base extension 18 includes a base hollow interior channel 20 extending through lateral base extension 18 and carrier base 14. A base tooth ring 22 is provided on the surface of lateral base extension 18. In the illustrated embodiment, base tooth ring 22 is defined by a series of grooves and ridges arranged in a circle.

As best shown in FIG. 6, a stop block channel, designated generally as 24, is disposed within base tooth ring 22 of lateral base extension 18. Stop block channel 24 including a first end wall 26 spaced around an interior circumference of base tooth ring 22 from a second end wall 28 to define stop block channel 24.

Figure 5:
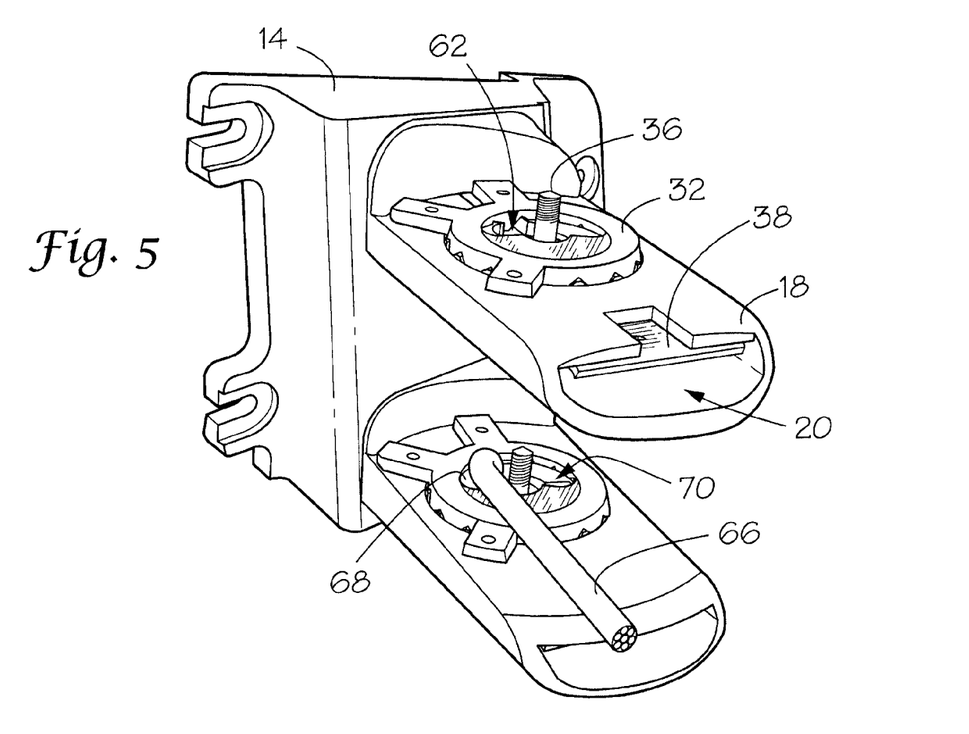
FIG. 5 shows a perspective view of the carrier base in a partially assembled configuration with the support arm tooth ring according to the present invention.
Figure 8:
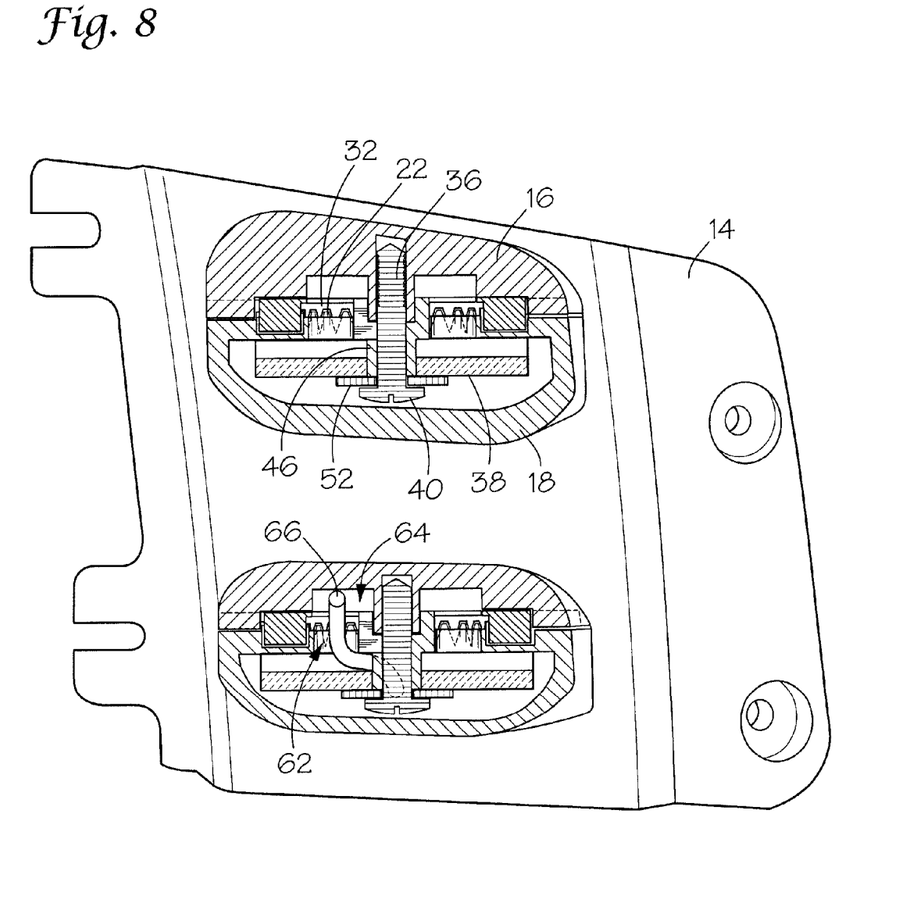
FIG. 8 shows an end cross-section view of the detent joint in a second position according to the present invention.
Figure 9:
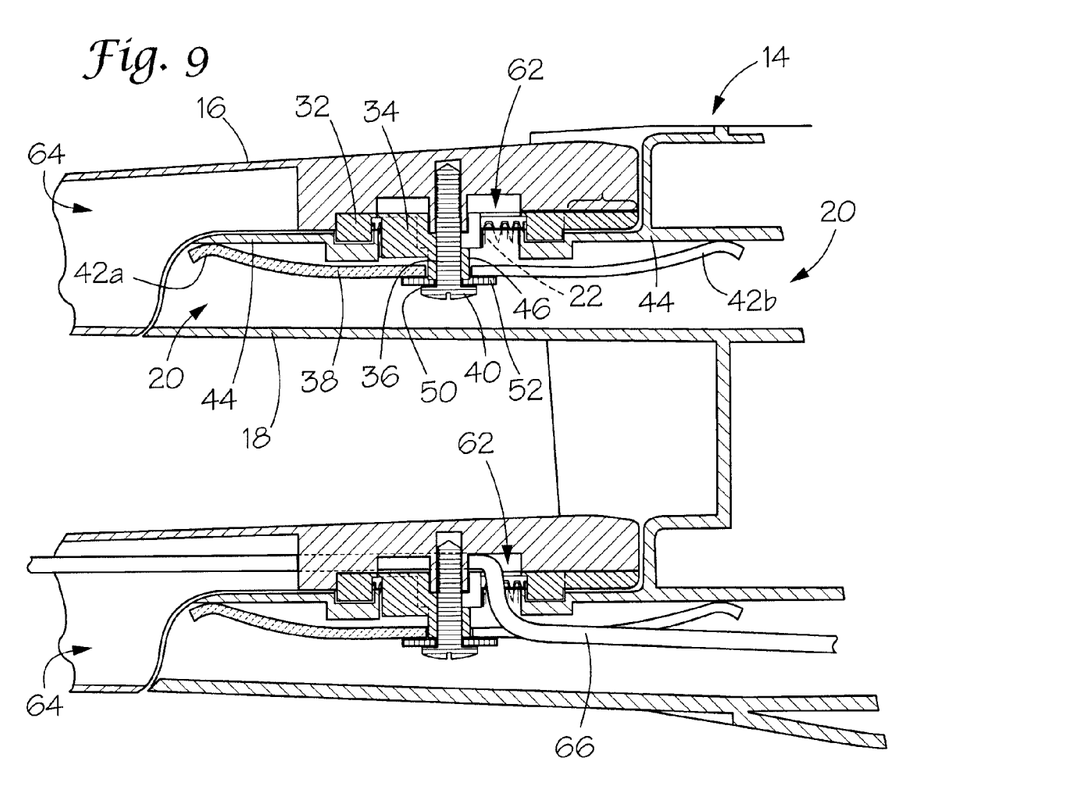
FIG. 9 shows a side cross-section view of the detent joint in a second position according to the present invention.

Referring to FIGS. 2 and 3, support arm 16 is pivotally carried on lateral base extension 18 for carrying a mirror head 30 (FIG. 1). A support arm tooth ring 32 is included on support arm 16 defined by a series of grooves and ridges. Support arm tooth ring 32 may be a separate insert affixed to support arm 16, as in the illustrated embodiment, or may be an integrated molded structure, in the same manner as base tooth ring 22 of carrier base 14. Referring to FIGS. 5, 8 and 9, support arm tooth ring 32 engages base tooth ring 22 in interlocking cooperation for holding support arm 16 in a position relative to lateral base extension 18.

Referring to FIGS. 3, 7A-7C, a stop block 34 is carried by support arm 16 and disposed within the circumference of support arm tooth ring 32. Stop block 34 is received into stop block channel 24 so that stop block 34 travels between first end wall 26 and second end wall 28 to define a range of pivotal movement of support arm 16 on lateral base extension 18.

Referring to FIGS. 2, 8 and 9, a connecting bolt 36 is carried by support arm 16 and disposed within support arm tooth ring 32. Connecting bolt 36 extends through base tooth ring 22 into hollow base interior channel 20. A leaf spring 38 is carried in hollow base interior channel 20 and engages a connector head 40 of connecting bolt 36. Preferably, a washer 52 is carried between connector head 40 and leaf spring 38 to provide support and a uniform platform on which connector head 40 can slide when support arm 16 is moved. Distal ends 42a and 42b of leaf spring 38 bias against an interior wall 44 of lateral base extension 18 that defines hollow base interior channel 20. The bias of leaf spring 38 draws connecting bolt 36 into hollow base interior channel 20 and maintains engagement between base tooth ring 22 and support arm tooth ring 32 to hold the position of support arm 16 relative to lateral base extension 18. When a sufficient lateral force is applied to support arm 16, the bias of leaf spring 38 may be overcome allowing support arm 16 to raise up on lateral base extension 18 to reposition support arm tooth ring 32 on base tooth ring 22 to provide a pivoting detent joint having a low profile.

Referring to FIGS. 3, 3A, 8 and 9, in the illustrated embodiment, a center column 46 is carried by support arm 16 and disposed within support arm tooth ring 32, generally in a central location. Center column 46 extends downward from support arm 16 through stop block channel 24 and is received into a slot, designated generally as 48 (FIG. 2), in leaf spring 38 in base hollow interior channel 20 so that a bottom side 50 of center column 46 is positioned generally adjacent connector head 40. Connecting bolt 36 extends from support arm 16 through center column 46 to hollow base interior channel 20 for engaging leaf spring 38.

Referring to FIGS. 3 and 3A, in the illustrated arrangement, stop block 34 extends laterally outward from center column 46 into stop block channel 24. Center column 46 is either directly affixed to support arm 16, or as shown, is molded into support arm tooth ring 32, which is then affixed to support arm 16. Thus, rotation of support arm 16 causes rotation of center column 46 and, in turn, stop block 34 within stop block channel 24. Further, a first guide block 54 is disposed adjacent a first side of stop block 34, and a second guide block 56 is disposed adjacent a second side of stop block 34 opposite the first side with first guide block 54.

Figures 7A, 7B, 7C:
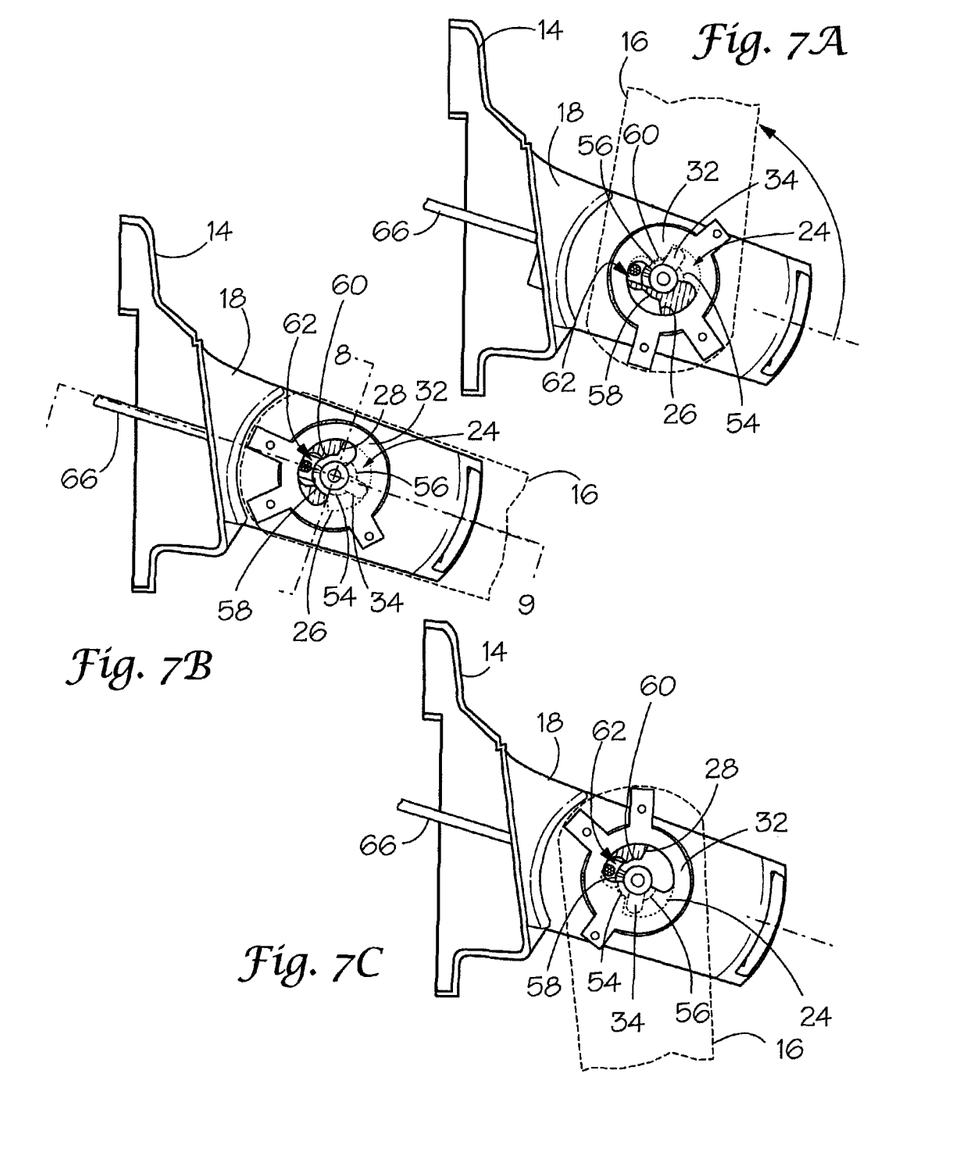
FIGS. 7A-7C shows a top cutaway view of the detent joint in various positions according to the present invention.

With further reference to FIG. 6, a first guide wall 58 is disposed in stop block channel 24 adjacent first end wall 26, and a second guide wall 60 is disposed in stop block channel 24 adjacent second end wall 28. First guide wall 58 and second guide wall 60 extend circumferentially within the circumference of base tooth ring 22. First end wall 26 and second end wall 28 extend radially inward from the circumference of base tooth ring 22 in a generally transverse orientation to first and second guide walls 58 and 60. Referring to FIGS. 7A-7C, when support arm 16 is moved from the home position shown in FIG. 7B, first guide block 54 engages first guide wall 58 when stop block 34 is rotated to engage first end wall 26, as shown in FIG. 7C. Second guide block 56 engages second guide wall 60 when stop block 34 is rotated to engage second end wall 28, as shown in FIG. 7A.

Referring to FIGS. 3-4, to accommodate various wiring considerations for operation components in mirror head 30, a continuous wiring passage, designated generally as 62, extends from base hollow interior channel 20 to a support arm hollow interior channel, designated generally as 64, for running wires 66 through carrier base 14 and support arm 16 to mirror head 30. Continuous wiring passage 62 is defined by slot 48 in leaf spring 38, a first wiring channel 68 disposed in base tooth ring 22, and a second wiring channel 70 disposed in support arm tooth ring 32. Referring to FIGS. 7A-7C, slot 48, first wiring channel 68 and second wiring channel 70 are vertically aligned to provide a continuous opening from base hollow interior channel 20 to support arm hollow interior channel 64. Further, second wiring channel 70 disposed in support arm tooth ring 32 is generally complementary in size to stop block channel 24, but aligned vertically over first wiring channel 68, so that wires 66 in continuous wiring passage 62 do not interfere with pivotal movement of support arm 16 defined by rotation of stop block 34 in stop block channel 24. Accordingly, regardless of which position support arm 16 is in, because second wiring channel 70 always maintains an opening between support arm hollow interior channel 64 and first wiring channel 68, the wires are never pinched.

While a preferred embodiment of the invention has been described using specific terms, such description is for illustrative purposes only, and it is to be understood that changes and variations may be made without departing from the spirit or scope of the following claims.

What is claimed is:

1. A low profile pivoting detent joint for a vehicle mirror assembly, comprising:
   a carrier base for mounting to the vehicle;
   a lateral base extension included on said carrier base and having a base hollow interior channel extending through said lateral base extension and said carrier base;
   a base tooth ring included on said lateral base extension defined by a series of grooves and ridges;
   a stop block channel disposed within said base tooth ring of said lateral base extension; said stop block channel including a first end wall spaced around an interior circumference of said base tooth ring from a second end wall to define said stop block channel;
   a support arm pivotally carried on said lateral base extension for carrying a mirror head;
   a support arm tooth ring included on said support arm defined by a series of grooves and ridges engaging said base tooth ring in interlocking cooperation for holding said support arm in a position relative to said lateral base extension;
   a stop block carried by said support arm and disposed within said support arm tooth ring; said stop block being received into said stop block channel so that said stop block travels between said first end wall and said second end wall to define a range of pivotal movement of said support arm on said lateral base extension;
   a connecting bolt carried by said support arm disposed within said support arm tooth ring and extending through said base tooth ring into said hollow base interior channel; and,
   a leaf spring carried in said hollow base interior channel engaging a connector head of said connecting bolt so that said leaf spring biases against an interior wall of said hollow base interior channel to draw said connecting bolt into said hollow base interior channel;
   whereby a pivoting detent joint is defined between said support arm and said lateral base extension of said carrier base.

2. The detent joint of claim 1 including a center column disposed within said support arm tooth ring extending from said support arm into said stop block channel.

3. The detent joint of claim 2 wherein said connecting bolt extends from said support arm through said center column to said hollow base interior channel.

4. The detent joint of claim 2 wherein said stop block extends laterally outward from said center column into said stop block channel so that rotation of said support arm causes rotation of said center column and said stop block within said stop block channel.

5. The detent joint of claim 2 wherein said center column extends through said stop block channel and is received into a slot in said leaf spring in said base hollow interior channel so that a bottom side of said center column is positioned generally adjacent said connector head.

6. The detent joint of claim 1 including a first guide block disposed adjacent a first side of said stop block, and a second guide block disposed adjacent a second side of said stop block opposite said first side.

7. The detent joint of claim 6 including a first guide wall disposed in said stop block channel adjacent said first end wall, and a second guide wall disposed in said stop block channel adjacent said second end wall, wherein said first guide block engages said first guide wall when said stop block is rotated to engages said first end wall, and said second guide block engages said second guide wall when said stop block is rotated to engage said second end wall.

8. The detent joint of claim 7 wherein said first guide wall and said second guide wall extend circumferentially within said base tooth ring circumference, and said first end wall and said second end wall extend radially inward from the circumference of said base tooth ring in a generally transverse orientation to said first and second guide walls.

9. The detent joint of claim 1 including a continuous wiring passage extending from said base hollow interior channel to a support arm hollow interior channel for running wires through said carrier base and support arm to the mirror head.

10. The detent joint of claim 9 wherein said continuous wiring passage is defined by a slot in said leaf spring, a first wiring channel disposed in said base tooth ring, and a second wiring channel disposed in said support arm tooth ring; wherein said slot, first wiring channel and second wiring channel are vertically aligned to provide a continuous opening from said base hollow interior channel to a support arm hollow interior channel.

11. The detent joint of claim 10 wherein said second wiring channel disposed in said support arm tooth ring is generally complementary in size to said stop block channel so that wires in said continuous wiring passage do not interfere with pivotal movement of said support arm defined by rotation of said stop block in said stop block channel.

12. A low profile pivoting detent joint for a vehicle mirror assembly, comprising:
   a carrier base for mounting to the vehicle;
   a lateral base extension included on said carrier base and having a base hollow interior channel extending through said lateral base extension and said carrier base;
   a base tooth ring included on said lateral base extension defined by a series of grooves and ridges;
   a support arm pivotally carried on said lateral base extension for carrying a mirror head;
   a support arm tooth ring included on said support arm defined by a series of grooves and ridges engaging said base tooth ring in interlocking cooperation for holding said support arm in a position relative to said lateral base extension;
   a connecting bolt carried by said support arm disposed within said support arm tooth ring and extending through said base tooth ring into said hollow base interior channel; and,
   a leaf spring carried in said hollow base interior channel engaging a connector head of said connecting bolt so that said leaf spring biases against an interior wall of said hollow base interior channel to draw said connecting bolt into said hollow base interior channel.

13. The detent joint of claim 12 including a stop block channel disposed within said base tooth ring of said lateral base extension; said stop block channel including a first end wall spaced around an interior circumference of said base tooth ring from a second end wall to define said stop block channel.

14. The detent joint of claim 13 including a stop block carried by said support arm and disposed within said support arm tooth ring; said stop block being received into said stop block channel so that said stop block travels between said first end wall and said second end wall to define a range of pivotal movement of said support arm on said lateral base extension.

15. The detent joint of claim 12 including a continuous wiring passage extending from said base hollow interior channel to a support arm hollow interior channel defined by a slot in said leaf spring, a first wiring channel disposed in said base tooth ring, and a second wiring channel disposed in said support arm tooth ring; wherein said slot, first wiring channel and second wiring channel are vertically aligned to provide a continuous opening from said base hollow interior channel to a support arm hollow interior channel for running wires through said carrier base and support arm to the mirror head.

* * * * *